Oct. 14, 1969    G. SEULEN ET AL    3,472,988

INDUCTIVE HARDENING OF WORKPIECES OF DIFFERING LENGTHS

Filed Sept. 28, 1967    2 Sheets-Sheet 1

Inventors
Gerhard Seulen
Friedhelm Reinke
Hermann Kuhlbars
By Cushman, Darby & Cushman
Attorneys

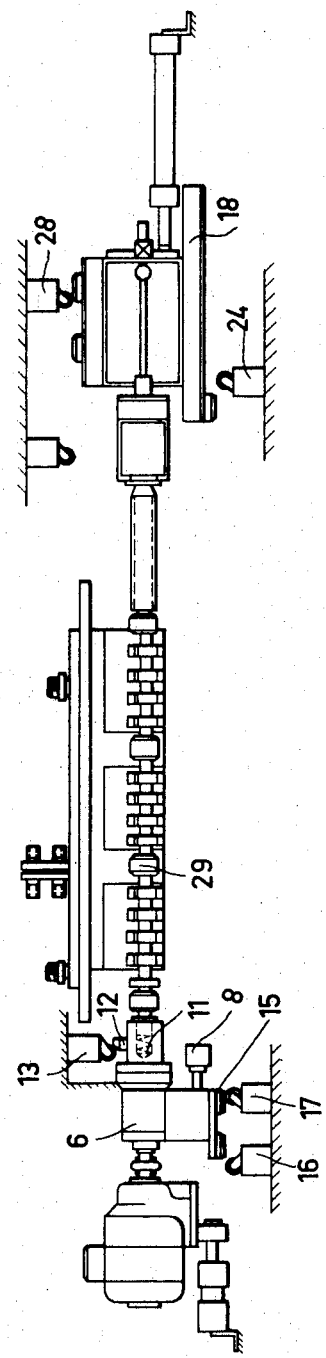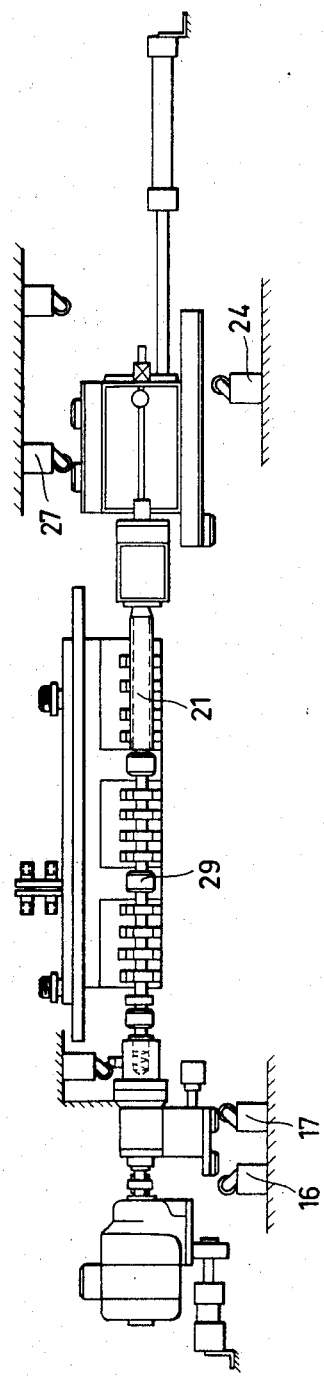

United States Patent Office 3,472,988
Patented Oct. 14, 1969

3,472,988
INDUCTIVE HARDENING OF WORKPIECES OF DIFFERING LENGTHS
Gerhard Seulen and Friedhelm Reinke, Remscheid, and Hermann Kuhlbars, Remscheid-Luttringhausen, Germany, assignors to AEG-Elotherm G.m.b.H., Remscheid-Hasten, Germany
Filed Sept. 28, 1967, Ser. No. 671,301
Claims priority, application Germany, Oct. 15, 1966, A 53,786
Int. Cl. H05b 5/00, 9/06, 9/02
U.S. Cl. 219—10.57                  6 Claims

ABSTRACT OF THE DISCLOSURE

In high-frequency induction heating equipment using a chucking arrangement for the workpiece comprising moveable spindle sleeves, a practical difficulty arises in heating workpieces of differing lengths, due to the upsetting of the heating effect of the conductor and other parameters. The invention provides that one of the spindle sleeves is equipped with a hollow, liquid-cooled make-up bar which is of such a length that it corresponds to at least the difference between the longest and shortest workpiece, whereby when the make-up bar is brought up to a short workpiece, it actuates the heating cycle to provide a uniform heating of long and short workpieces.

---

This invention relates to an arrangement for the inductive hardening of workpieces of differing lengths, particularly workpieces comprising a plurality of surface elements disposed alongside one another on an elongate portion of the workpiece. Such workpieces include for example cam-shafts.

Proposals have previously been made for the continuous, inductive hardening of bearings on cranked, rotating shafts by the use of movably arranged inductors which cover only partially the workpiece surface. In such an arrangement, the shafts to be treated are conveyed automatically to the hardening station, lifted, chucked and aligned, and the workpiece is subsequently set in rotation and the inductors are automatically lowered on the bearing to be hardened. For chucking the workpiece, there is provided in the known arrangement at the chucking position, an axially movable spindle sleeve formed as a piston, while a counter spindle sleeve is equipped with a flexible centre moving axially inwards in a fixed end position.

These known arrangements may be constructionally altered so that different elongate workpieces of uniform length, such as, for example, cam-shafts for automobile engines, can be fully automatically hardened.

With the aforementioned arrangements, some improvement in the hardening of workpieces to be produced in large-scale series has been obtained, but it has always been found hitherto that only workpieces of equal length can be treated in each installation, with the result that for users such as automobile manufacturers in whose production programme are included engines of different powers and consequently cam- or crank-shafts of differing length, high capital charges, multiple space requirements and many machine operators, are required.

Such disadvantages are obviated by the invention, which provides an induction heating arrangement using high-frequency alternating voltage for the fully automatic inductive hardening of workpieces of differing length and a differing number of points to be hardened for example cam-shafts, in which a make-up bar is disposed to represent an extension of a shorter shaft, in such a way that the heating and hardening procedure becomes identical to that of a longer workpiece.

The invention consists of a high-frequency induction heating arrangement for the fully automatic, inductive hardening of workpieces of differing length of the type in which the workpiece is chucked and rotated under the inductor in a pair of axially displaceable spindle sleeves; in which one spindle sleeve is equipped with a hollow, liquid-cooled make-up bar of a length to make up the difference between a relatively long and a relatively short workpiece, whereby movement of the said make-up bar and its associated spindle sleeve to either a long or a short workpiece in a heating position actuates switch means adapted to control a heating cycle to provide similar heating effects to long or short workpieces.

In the arrangement according to the invention, additional means may be employed if necessary, to provide that the time lapse between the ejection of two hardened workpieces remains constant, regardless of whether a long or a short workpiece is hardened in the machine. A particularly useful feature of the new arrangement by which different workpieces can be brought to the hardening position in random sequence, is that the hardened workpieces of differing length should be of the same hardness, whereby undesirable modification of the arrangement becomes no longer necessary. Thus in one embodiment in the induction heating arrangement both for long and short workpieces, the water-cooled make-up bar has dimensions and is of such material that for heating a short workpiece, it represents the difference in both mechanical and electrical differences between long and short workpieces under the inductor, so that the whole inductor shows approximately the same total resistance as with a long workpiece.

The arrangement is further amplified according to the invention in that, after insertion of a short workpiece, a limit-switch shown at 27 in the accompanying drawings is operated, by means of which, for the purpose of electrical matching, an alteration of the heating-time and/or of the compensation and/or power (MF-voltage) is adjustable as may be necessary.

This matching by the operation of the said limit-switch, can be produced in a way known per se, in that previously fixed values, for example for heating-time, compensation and voltage, are pre-set or, depending on the conditions in the workpiece or inductor, they are continuously regulated.

An embodiment of the invention is hereinafter described and illustrated in the accompanying drawings, which each represent vertical sections of a chucking device, of which:

FIGURE 2 shows the chucking device with a chucked cam-shaft for a six-cylinder internal combustion engine; and FIGURE 3 shows in the chucking device the chucked cam shaft for a four-cylinder internal combustion engine.

Figure 1:
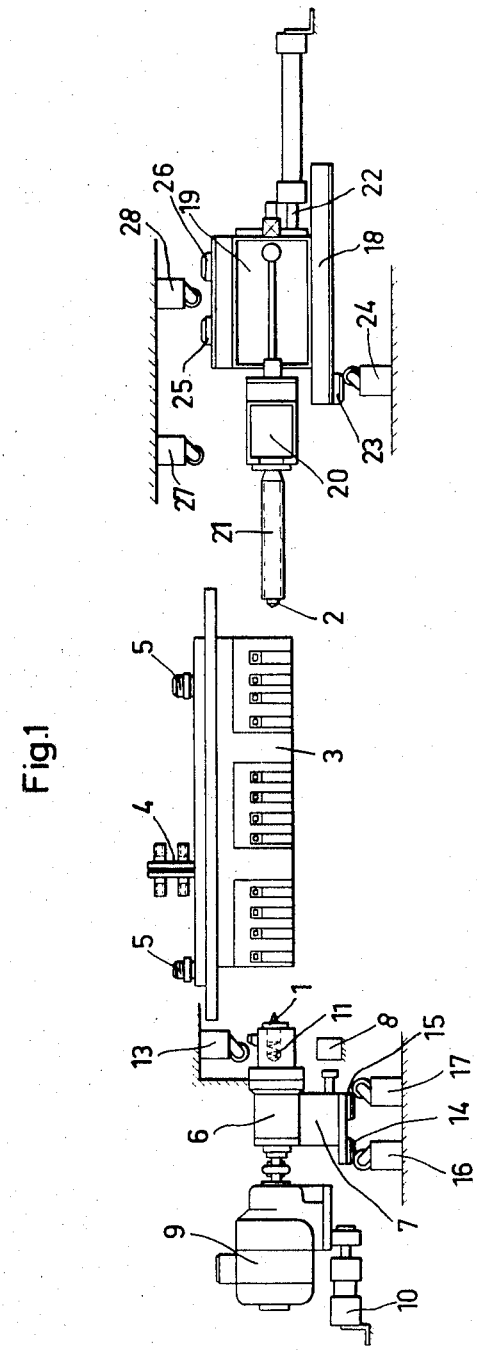
FIGURE 1 shows the chucking device with a heating station for the induction heating arrangement according to the invention, in the idle position.

Referring to FIGURE 1, the inductor 3 arranged above the line joining the centres 1 and 2 of the chucking device, is provided with electrical terminals 4, and cooling water connections 5 for cooling the hollow induction lead. To the left of the inductor is spindle sleeve 6 which is mounted so as to be axially movable on a support 7 as far as stop 8, and is connected with a driving motor 9 for rotation of the workpiece. The said axial movement takes place by means of a working cylinder 10 actuated either hydraulically or pneumatically. The centre 1 is axially movable within the spindle sleeve 6 against the force of a compression spring 11, the shaft of the centre 1 being provided with a trip-cam 12, which, when the centre is pressed home, actuates the rigidly mounted switch 13. The support 7 is provided with further trip-cams 14 and 15 for actuating the switches 16 and 17.

The part of the chucking arrangement shown in the drawings to the right of the inductor shows a somewhat similar construction, in which on a support 18 is mounted spindle sleeve 20 connected with a cooling-water tank 19. A water-cooled make-up bar 21 forms the connection between the centre 2 and the spindle sleeve 20.

Axial movement of the spindle sleeve 20 takes place by means of a working cylinder, the piston-rod of which is designated by 22. The support 18 is provided with trip-cams 23 for actuating the switch 24 and the trip-cams 25 and 26 for actuating the switches 27 and 28.

Before beginning the heating or hardening process, the workpiece is brought into the effective range of the inductor in such a way that its axis of rotation coincides with the line joining the centres 1 and 2. This can be achieved using conventional methods, for example the workpiece can be inserted at its ends on prism-shaped members of an endless chain conveyor supported in the induction heating arrangement. If the workpiece is below the inductor, the conveyor is stopped and the workpiece is lifted by suitable means into the effective range of the inductor. After reaching its required position, the workpiece actuates a limit-switch (not shown) by means of which the forward movement of the spindle sleeve 6, as may be seen from FIGURE 2, is induced.

When the spindle sleeve 6 has moved forward as far as the stop 8, the trip-cam 15 actuates the switch 17 which induces the forward movement of the support 18. Finally by this axial movement the centre 2 comes into engagement with the workpiece 29 which presses against the centre 1. Thereby follows an axial movement of the centre 1 against the force of the spring 11 until the cam 12 actuates the switch 13. Simultaneously by means of the switch 13, the inductor is connected to the voltage source and the rotation of the workpiece commences.

The switch 28 in the closed position indicates that a long workpiece is in position in the hardening arrangement. Simultaneously, by means of the said switch a timer with a pre-selected, constant or an automatically-setting switching-time is actuated, which determines the duration of the heating. After the heating, the quenching of the heated workpiece takes place, and the rotation of the workpiece is then stopped and the workpiece, after the spindle sleeves have been withdrawn into their idle position, is lowered onto the conveyor chain.

In FIGURE 3, the workpiece 29 is a four-cylinder cam-shaft, i.e. a short workpiece, the presence of which is indicated by closure of switch 27. The water-cooled make-up bar is, during heating and hardening of this workpiece, in the effective range of the inductor. The progress of the hardening does not differ in this instance from that applied to a long workpiece.

What is claimed is:
1. A high-frequency induction heating arrangement for the fully automatic, inductive hardening of workpieces of differing length of the type in which the workpiece is chucked and rotated under the inductor in a pair of axially displaceable spindle sleeves; in which one spindle sleeve is equipped with a hollow, liquid-cooled make-up bar of a length to make up the difference between a relatively long and a relatively short workpiece, and to provide electrical compensation between a relatively long and a relatively short workpiece whereby movement of the said make-up bar and its associated spindle sleeve to either a long or a short workpiece in a heating position actuates switch means adapted to control a heating cycle to provide similar heating effects to long or short workpieces.

2. An induction heating arrangement according to claim 1, in which the said water-cooled make-up bar has dimensions and is formed of such material that it compensates for mechanical and electrical differences in operation which would arise between a long and short workpiece so that the whole inductor when heating a short orkpiece, has approximately the same total resistance as in a long orkpiece.

3. An induction heating arrangement according to claim 1, in which a limit-switch is provided, which is adapted to be operated by movement of one of the spindle sleeves when closing onto a short workpiece, whereby electrical matching and alteration of the heating time is adjusted for the heating of the short workpiece.

4. An induction heating arrangement according to claim 1, in which the spindle sleeve pairs are mounted on supports axially displaceable.

5. An induction heating arrangement according to claim 1, in which the axial displacement of a support of the spindle sleeve not equipped with the make-up bar, is limited by a stop.

6. A high-frequency induction heating arrangement for the fully automatic, inductive hardening of workpieces of differing length of the type in which the workpiece is chucked and rotated under the inductor in a pair of axially displaceable spindle sleeves; in which one spindle sleeve is equipped with a hollow, liquid-cooled make-up bar of a length to make up the difference between a relatively long and a relatively short workpiece, the centre of the spindle sleeve not equipped with the make-up bar being provided with a radial cam projecting above the said spindle sleeve and being axially displaceable in the spindle sleeve against a spring, whereby movement of the said make-up bar and its associated spindle sleeve to either a long or a short workpiece in a heating position actuates switch means adapted to control a heating cycle to provide similar heating effects to long or short workpieces.

References Cited

UNITED STATES PATENTS

| | | | |
|---|---|---|---|
| 2,794,894 | 6/1957 | Tudbury | 219—10.57 |
| 3,101,165 | 8/1963 | Barkley et al. | 219—10.79 X |

JOSEPH V. TRUHE, Primary Examiner

L. H. BENDER, Assistant Examiner

U.S. Cl. X.R.

219—10.59, 10.79